United States Patent
Lee et al.

(10) Patent No.: US 7,814,795 B2
(45) Date of Patent: Oct. 19, 2010

(54) DUAL MODE MEASUREMENT SYSTEM WITH QUARTZ CRYSTAL MICROBALANCE

(75) Inventors: Chao-Fa Lee, Taipei (TW);
Cheng-Hsing Kuo, Taipei (TW);
Tsong-Rong Yan, Taipei (TW)

(73) Assignee: Tatung Company, Taipei (TW)

( * ) Notice: Subject to any disclaimer, the term of this patent is extended or adjusted under 35 U.S.C. 154(b) by 378 days.

(21) Appl. No.: 12/107,788

(22) Filed: Apr. 23, 2008

(65) Prior Publication Data

US 2009/0165560 A1    Jul. 2, 2009

(30) Foreign Application Priority Data

Dec. 28, 2007    (TW) ............... 96151031 A

(51) Int. Cl.
*G01G 11/04* (2006.01)
(52) U.S. Cl. ............... 73/580; 73/54.24; 73/54.41; 73/579
(58) Field of Classification Search ............... 73/54.24, 73/54.41, 61.75, 61.79, 64.53, 579, 580
See application file for complete search history.

(56) References Cited

U.S. PATENT DOCUMENTS

| 4,044,317 | A | * | 8/1977 | Newell et al. | ........... 331/116 R |
| 5,552,274 | A | * | 9/1996 | Oyama et al. | ................ 435/6 |
| 5,837,885 | A | * | 11/1998 | Goodbread et al. | ......... 73/32 A |
| 5,999,062 | A |  | 12/1999 | Gilbert | |
| 6,006,589 | A |  | 12/1999 | Rodahl et al. | |
| 6,111,342 | A | * | 8/2000 | Muramatsu et al. | ......... 310/366 |
| 7,036,375 | B2 |  | 5/2006 | Nozaki | |
| 7,045,931 | B2 | * | 5/2006 | Yoshimine et al. | .......... 310/322 |
| 7,509,860 | B2 | * | 3/2009 | Lee et al. | ....................... 73/579 |

* cited by examiner

*Primary Examiner*—J M Saint Surin
(74) *Attorney, Agent, or Firm*—Jianq Chyun IP Office

(57) ABSTRACT

A dual mode measurement system with quartz crystal microbalance (QCM) is provided, which includes a quartz sensing component, a first measurement circuit, a second measurement circuit and a switch unit. When the first measurement circuit is selected through the switch unit, the first measurement circuit and the quartz sensing component form an oscillation circuit and output a resonance signal. When the second measurement circuit is selected through the switch unit, the second measurement circuit outputs a frequency scanning signal to scan the quartz sensing component, so as to output an impedance sensing signal.

13 Claims, 3 Drawing Sheets

DUAL MODE MEASUREMENT SYSTEM WITH QUARTZ CRYSTAL MICROBALANCE

CROSS-REFERENCE TO RELATED APPLICATION

This application claims the priority benefit of Taiwan application serial no. 96151031, filed on Dec. 28, 2007. The entirety of the above-mentioned patent application is hereby incorporated by reference herein and made a part of this specification.

BACKGROUND OF THE INVENTION

1. Field of the Invention

The present invention generally relates to a measurement system, and more particularly to a dual mode measurement system using quartz crystal microbalance (QCM) to measure the mass and properties of an object to be measured.

2. Description of Related Art

Quartz crystal microbalance (QCM) is mainly used for measurement and sensing of trace substances, which has been applied in the field of biological sensor in recent years. Quartz is a piezoelectricity material, which is capable of performing energy conversion between mechanical energy and electric energy, which is called a piezoelectric effect. The piezoelectric sensors in the early stage, such as a surface acoustic wave (SAW) sensor, are mostly applied to measure contaminating materials in the air. The piezoelectric sensor has the characteristics of high sensitivity, high response speed, and portability, which thus is especially suitable for gas sensing in the relevant fields of public security, environmental protection, etc. Moreover, the piezoelectric crystal sensor has also been applied in vehicle tire pressure sensors, biological chips, and other fields.

A quartz sensing component applied in the QCM is generally clad with a layer of metal electrode, for example, gold electrode, for transmitting sub-signals. When the quartz sensing component generates physical deformation under a pressure, the resonance frequency of the quartz sensing component changes, and a tiny change for the mass of an object to be measured on the quartz crystal surface can be obtained based upon a variation relationship between the mass attached to the quartz crystal surface and the quartz oscillation frequency. The QCM deduces the change of the mass based on the variation of the frequency, and thus it has a relatively high sensitivity. If the frequency variation corresponding to each unit of mass change is several Hz, the sensitivity of the QCM reaches up to a level of $10^{-9}$ g for each unit of mass.

However, as for a biological sensor, it is rather insufficient to merely measure the mass of the object to be measured. If the biological sensor needs to analyze the quartz crystal AC impedance distribution and observe an acting force between the quartz surface and the carrier, so as to provide more messages in terms of the biological measurement, the object to be measured is must be moved to another measurement system, thereby increasing the measurement errors.

SUMMARY OF THE INVENTION

Accordingly, the present invention is directed to a measurement system, which integrates a frequency measurement system and an impedance measurement system into the same measurement system through a switch circuit, such that a quartz crystal microbalance (QCM) can measure the mass of an object to be measured and the acting properties between the object to be measured and a quartz crystal surface. Therefore, the measurement system of the present invention has two measurement modes.

The present invention provides a measurement system, which includes a quartz sensing component, a first measurement circuit, a second measurement circuit, and a switch unit. The first measurement circuit has an input end coupled to a first end of the quartz sensing component. The second measurement circuit is used for outputting a frequency scanning signal. The switch unit is coupled between the first measurement circuit and the quartz sensing component and between the second measurement circuit and the quartz sensing component, so as to select one of outputs of the first measurement circuit and the second measurement circuit, for being output to the quartz sensing component. When the first measurement circuit is selected through the switch unit, the first measurement circuit and the quartz sensing component form an oscillation circuit and output a resonance signal. When the second measurement circuit is selected through the switch unit, the second measurement circuit scans the quartz sensing component by the frequency scanning signal, so as to output an impedance sensing signal.

In an embodiment of the present invention, the switch unit is coupled between the first measurement circuit and a second end of the quartz sensing component, and between the second measurement circuit and a second end of the quartz sensing component, for selecting one of the output of the first measurement circuit and the frequency scanning signal, for being output to the second end of the quartz sensing component.

In an embodiment of the present invention, the measurement system further includes a sample and hold circuit coupled to the second end of the quartz sensing component, for converting the impedance sensing signal into a baseband signal.

In an embodiment of the present invention, the measurement system further includes a counter, coupled to the output of the first measurement circuit, for calculating a frequency of the resonance signal.

In an embodiment of the present invention, the switch unit and the counter are formed by a complex programmable logic device.

In an embodiment of the present invention, the measurement system further includes an enable circuit and a bias circuit. The enable circuit is coupled between a voltage source and the first measurement circuit, for controlling a power supply of the first measurement circuit. The bias circuit is coupled to the second end of the quartz sensing component, for determining a DC level of the second end of the quartz sensing component.

In an embodiment of the present invention, the first measurement circuit includes a comparator, a first emitter follower, a second emitter follower, and a capacitor. The comparator has a first input end coupled to the second end of the quartz sensing component, and has a second input end coupled to the output of the first measurement circuit. The first emitter follower is coupled between a first output of the comparator and the output of the first measurement circuit, for outputting the resonance signal. The second emitter follower is coupled to a second output of the comparator, for outputting a reverse resonance signal. The capacitor is coupled to the output of the first measurement circuit and a ground end. The first output and the second output of the comparator are signals with reversed phases, and the resonance signal and the reverse resonance signal have reversed phases but the same frequency. Through counting the reverse resonance signal, the measurement system can obtain the resonance frequency of the quartz sensing component when sensing the object to be measured.

In an embodiment of the present invention, the second measurement circuit includes a voltage control oscillator (VCO) or a signal generator, for outputting the frequency scanning signal. The frequency scanning range of the frequency scanning signal includes a resonance frequency of the quartz sensing component. Moreover, the second measurement circuit may output the frequency scanning signal through a phase lock loop (PLL), such that the frequency becomes more accurate.

In the present invention, the frequency measurement system and the impedance measurement system are integrated in the same measurement system, and thus the QCM of the present invention can simultaneously measure two properties of the object to be measured, including the mass and the acting force relation between the object to be measured and the quartz crystal surface, which thus provides a more convenient measurement system for the users, so as to avoid measurement errors caused by moving the object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
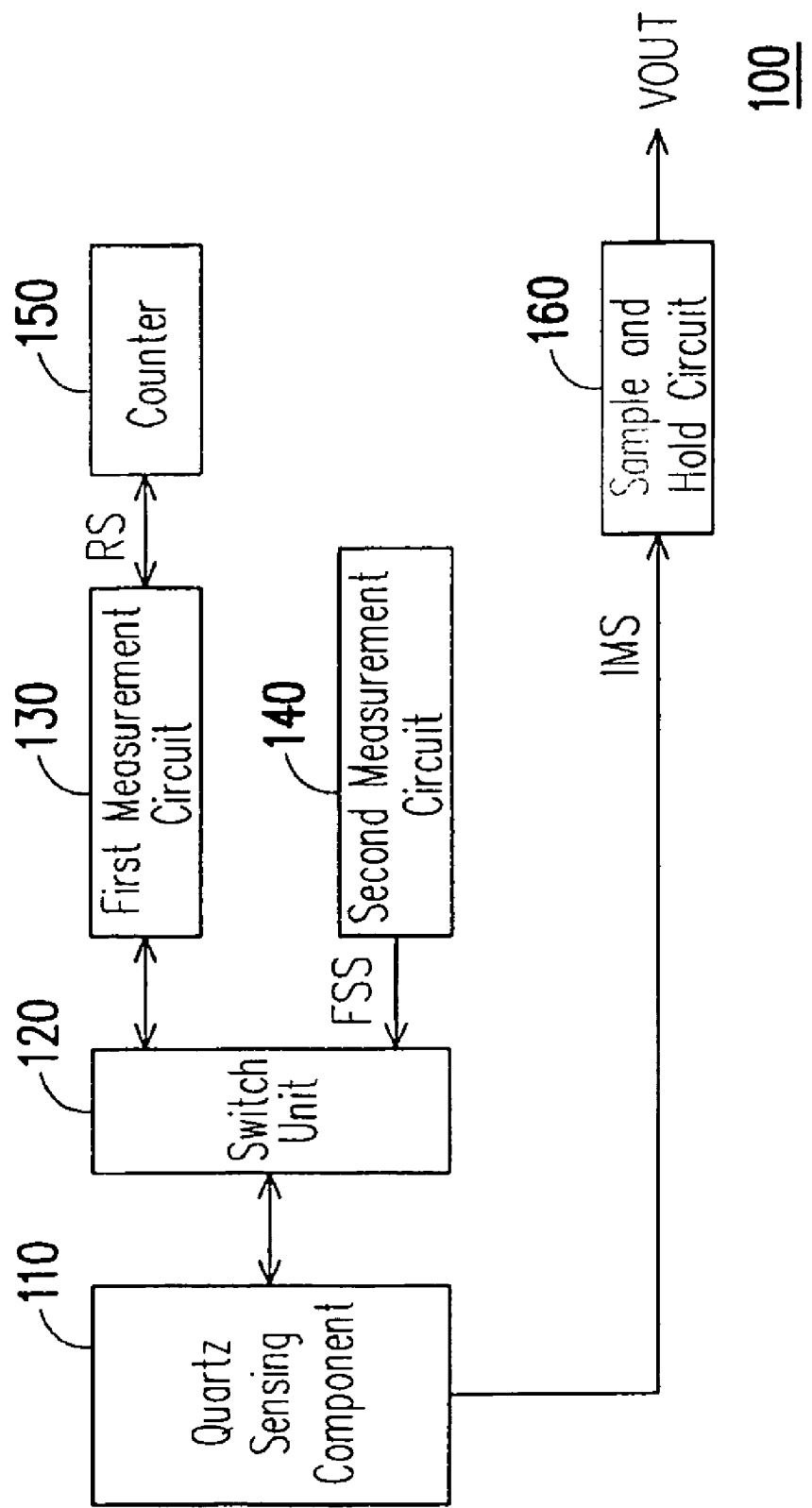
FIG. 1 is a block diagram of a measurement system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

FIG. 1 is a block diagram of a measurement system according to an embodiment of the present invention. The measurement system 100 includes a quartz sensing component 110, a switch unit 120, a first measurement circuit 130, a second measurement circuit 140, a counter 150, and a sample and hold circuit 160. The switch unit 120 is coupled between the quartz sensing component 110 and the first measurement circuit 130 and between the quartz sensing component 110 and the second measurement circuit 140. The counter 150 is coupled to an output of the first measurement circuit 130, for counting a frequency of a resonance signal RS. The sample and hold circuit 160 is coupled to an end of the quartz sensing component 110, for sampling a baseband signal in an impedance sensing signal IMS.

The frequency response of the quartz sensing component 110, for example, resonance frequency and impedance variation properties at different frequency points, varies depending on the weight and substance state (e.g., liquid state or solid state) of an object to be measured. However, the circuits required for measuring the resonance frequency and that required for measuring the impedance are different, and thus, the first measurement circuit 130 and the second measurement circuit 140 are respectively used in this embodiment. The first measurement circuit 130 and the quartz sensing component 110 may form a frequency measurement system, for sensing the mass of the object to be measured. The second measurement circuit 140 and the quartz sensing component 110 may form an impedance measurement system, for sensing an acting force between the object to be measured and the quartz crystal surface. The switch unit 120 is used for switching between the first measurement circuit 130 and the second measurement circuit 140.

When the first measurement circuit 130 is selected through the switch unit 120, the first measurement circuit 130 and the quartz sensing component 110 form an oscillation circuit and output a resonance signal RS. The frequency of the resonance signal RS is then calculated through the counter 150. Therefore, the measurement system can deduce the mass of the object to be measured through the frequency variation of the resonance signal RS. When the second measurement circuit 140 is selected through the switch unit 120, the second measurement circuit 140 scans the quartz sensing component 110 by a frequency scanning signal FSS. The frequency scanning signal FSS gradually increases to a high frequency from a low frequency or decreases to a low frequency from a high frequency, according to a preset scanning range that covers the resonance frequency of the quartz sensing component 110. Thereafter, the impedance sensing signal IMS is output from the other end of the quartz sensing component 110.

Due to different states of the object to be measured, different acting forces are generated with the quartz crystal surface, which may influence the frequency response property of the quartz sensing component 110, such that the quartz sensing component 110 generates different property impedances in different frequency bands. In other words, the quartz sensing component 110 may be considered as a filter, and the impedance sensing signal IMS includes a baseband signal and a carrier signal, in which the carrier signal is generated by the frequency scanning signal FSS, and the baseband signal is generated by the frequency response property of the quartz sensing component 110. The sample and hold circuit 160 is coupled to the other end of the quartz sensing component 110, for filtering out the carrier signal in the impedance sensing signal IMS, but only holding the baseband signal thereof. Through an output signal VOUT of the sample and hold circuit 160, the measurement system 100 can deduce the frequency response property of the quartz sensing component 110 and equivalent impedance variation in different frequency bands.

Figure 2:
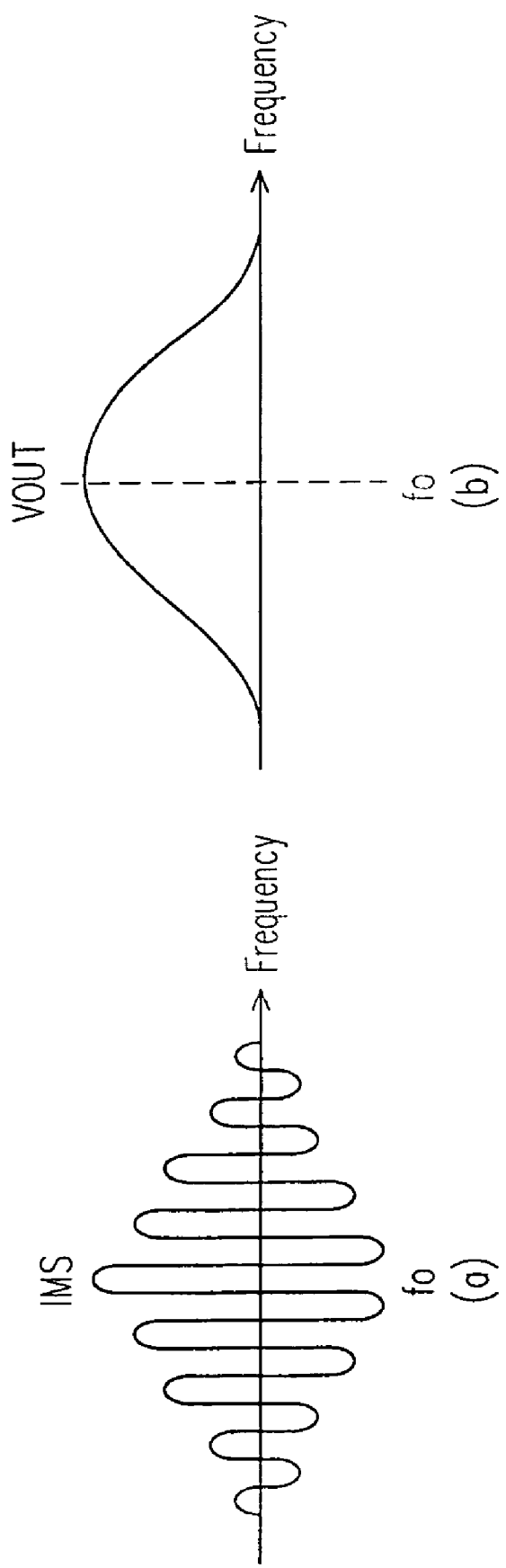
FIG. 2 is a schematic view of waveforms of an impedance sensing signal IMS and an output signal VOUT.

FIG. 2 is a schematic view of waveforms of an impedance sensing signal IMS and an output signal VOUT. As shown in FIG. 2(a), the impedance sensing signal IMS includes the carrier signal and the baseband signal, and after being sampled by the sample and hold circuit 160, the output signal VOUT thereof only holds the baseband signal, in which the scanning range of the frequency scanning signal FSS includes a resonance frequency $f_0$ of the quartz sensing component 110. The measurement system 100 can analyze the impedance variation in the frequency spectrum based on the amplitude of the output signal VOUT and the corresponding frequency value, such that the user can get to know the acting force between the object to be measured and the quartz crystal surface, thereby obtaining the substance state of the object to be measured through deduction, e.g., solid state or liquid state, or viscous state.

Moreover, it should be noted that, the counter 150 and the switch unit 120 may be formed by a complex programmable logic device (CPLD). The second measurement circuit 140 may be a voltage control oscillator (VCO) or a phase lock loop (PLL). In practical circuit design, circuits such as an enable circuit and a bias circuit of the power supply may be added depending upon the designing requirements, and thus the measurement system can be used more conveniently.

Second Embodiment

Figure 3:
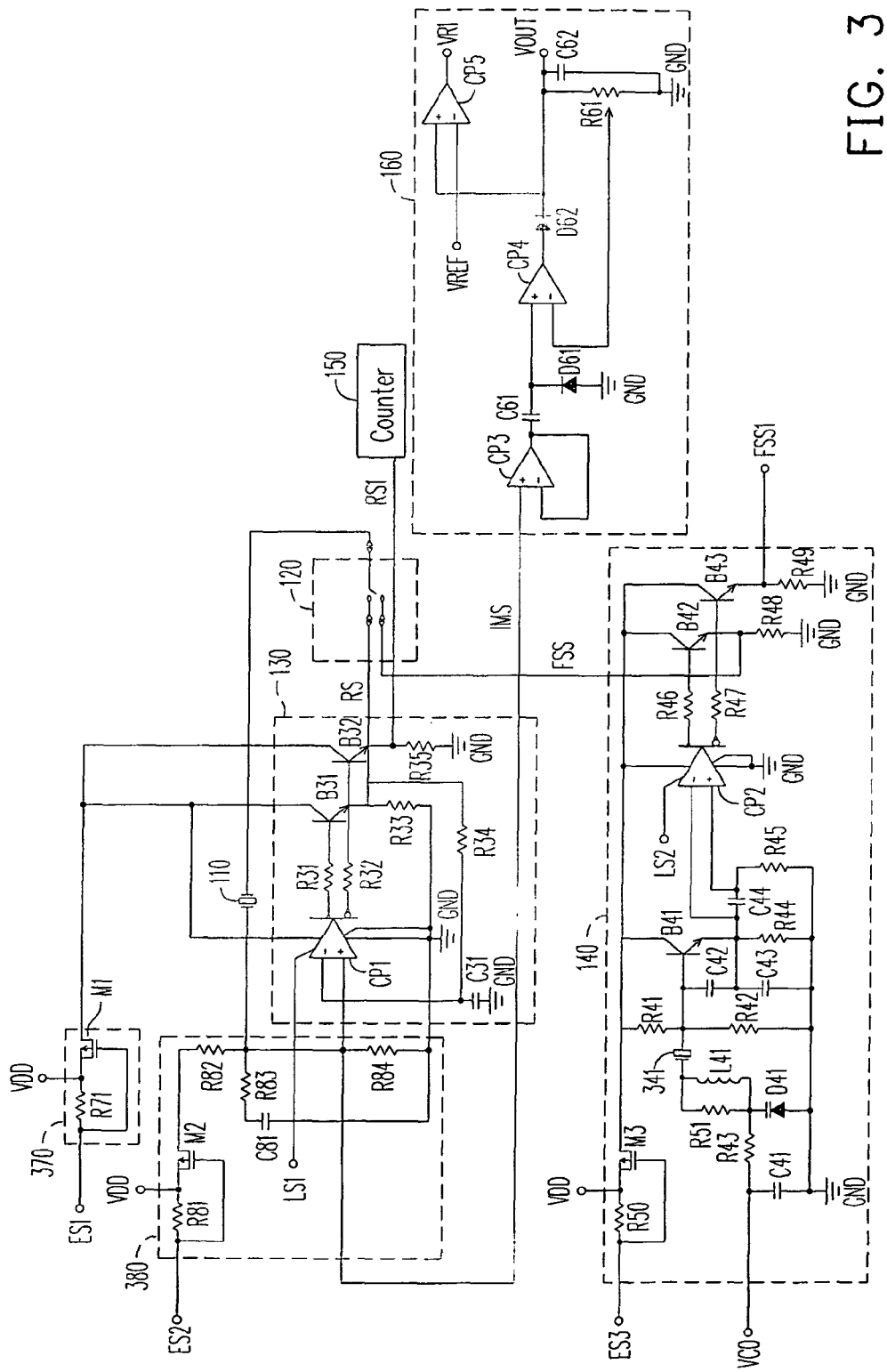
FIG. 3 is a circuit diagram of a measurement system according to a second embodiment of the present invention.

The circuit structure in this embodiment of the present invention is further illustrated below in great detail, FIG. 3 is a circuit diagram of a measurement system according to a second embodiment of the present invention. Referring to FIG. 1, FIG. 3 shows a circuit implementation of FIG. 1. The detailed circuits of the first measurement circuit 130, the second measurement circuit 140, the enable circuit 370, the bias circuit 380, and the sample and hold circuit 160 can be obtained with reference to FIG. 3 and the following illustrations. The switch unit 120 can be implemented as a two-to-one changeover switch or a multiplexer.

The first measurement circuit 130 includes a comparator CP1, resistors R31-R35, bipolar junction transistors (BJTs) B31, B32, and a capacitor C31. The comparator CP1 is coupled between the enable circuit 370 and a ground end GND, and the comparator CP1 has a positive input end coupled to an end of the quartz sensing component 110, and has a negative input end coupled to a feedback end. A latch signal LS1 is used for controlling the output DC level of the comparator CP1. The comparator CP1 has two output ends for outputting signals with reversed phases. The BJT B31 and the resistor R33 form an emitter follower, which is coupled to an output end of the comparator CP1 through the resistor R31.

When the switch unit 120 couples an emitter of the BJT B32 to the quartz sensing component 110, the first measurement circuit 130 and the quartz sensing component 110 form an oscillation circuit, and the resonance signal RS is output at a common node between the BJT B31 and the resistor R33. The BJT B32 and the resistor R35 form another emitter follower, which is coupled to the other output end of the comparator CP1 through the resistor R32, and the reverse resonance signal RS1 is output at a common node between the BJT B32 and the resistor R35.

The signals output from two output ends of the comparator CP1 have reversed phases but the same frequency, so the reverse resonance signal RS1 and the resonance signal RS have the same frequency. The counter 150 can obtain the frequency of the resonance signal RS by counting the frequency of the reverse resonance signal RS1. It should be noted that, the counter 150 may also be directly coupled to the emitter end of the BJT B31 to count the frequency of the resonance signal RS. In this embodiment, the emitter follower formed by the BJT B32 and the resistor R35 is used to generate the reverse resonance signal RS1, so as to count the frequency of the resonance signal RS indirectly, thereby avoiding the load generated by the counter 150 from affecting the resonance frequency of the quartz sensing component 110. In other words, two emitter followers are taken as two different output stages, thereby preventing the measurement circuits from affecting the accuracy of the output signal.

The enable circuit 370 includes a resistor R71 and a metal-oxide-semiconductor field effect transistor (MOSFET) (briefly referred to as transistor) M1. The resistor R71 is coupled between an enable signal ES1 and the transistor M1, the other end of the transistor M1 is coupled to the first measurement circuit 130, a gate of the transistor M1 is controlled by the enable signal ES1, and a voltage source VDD is coupled to a common node between the transistor M1 and the resistor R71. When the enable signal ES1 enables, the transistor M1 is turned on, and the voltage source VDD provides the working voltage and current to the first measurement circuit 130.

The bias circuit 380 includes resistors R81-R84, a transistor M2, and a capacitor C81. The bias circuit 380 is coupled to an end of the quartz sensing component 110, and determines the DC level at an end of the quartz sensing component 110 through the resistors R82, and R84. Meanwhile, the DC level at the positive output end of the comparator CP1 may be adjusted through the ratio of the resistors R82 and R84.

The second measurement circuit 140 includes a transistor M3, resistors R41-R51, BJTs B41-B43, capacitors C41-C44, an inductor L41, a diode D41, and a comparator CP2. In this embodiment, the second measurement circuit 140 may be considered as a voltage control oscillator, and the oscillation frequency of a quartz crystal 341 is controlled by adjusting the voltage VCO, and outputting a frequency scanning signal FSS and a reverse frequency scanning signal FSS1 having reversed phases through the comparator CP2 and two emitter followers (respectively formed by the BJTs B42-B43 and the resistors R48 and R49).

The second measurement circuit 140 has a main circuit architecture of a voltage control oscillator, and the main circuit architecture and coupling relations thereof can be directly known with reference to FIG. 3, which thus will not be described repeatedly herein. It should be noted that, the architectures of the resistor R50 and the transistor M3 are the same as that of the enable circuit 370, but they are controlled by an enable signal ES3. The output DC level of the comparator CP2 is controlled by a latch signal LS2. The emitter followers formed by the BJTs B42-B43 and the resistors R48 and R49 have the same function as that of the first measurement circuit 130, which are mainly used for isolating internal signals of the circuits from the signals for measurement, which thus will not be described repeatedly herein. In this embodiment, the second measurement circuit 140 may be replaced by a signal generator, as long as signals with different frequencies can be generated, which is not limited to that shown in FIG. 3. Those of ordinary skill in the art can easily appreciate other feasible circuit architectures under the disclosure of the present invention, which thus is not described repeatedly herein.

When the switch unit 150 switches to the frequency scanning signal FSS, the frequency scanning signal FSS output by the second measurement circuit 140 is transmitted to the quartz sensing component 110 to be scanned through the switch unit 120, so as to scan the quartz sensing component 110, and then, the impedance sensing signal IMS is output at the other end of the quartz sensing component 110. The frequency scanning range of the frequency scanning signal FSS is determined depending upon the resonance frequency of the quartz sensing component 110. The impedance sensing signal IMS reflects the impedance variation of the quartz sensing component 110, and thus the acting force between the object to be measured and the quartz crystal surface can be known through deduction.

The sample and hold circuit 160 includes comparators CP3-CP5, diodes D61, D62, a variable resistor R61, and capacitors C61, C62. The comparator CP3 is coupled between the impedance sensing signal IMS and the capacitor C61, and the diode D61 is coupled between the other end of the capacitor C61 and the ground end GND. The comparator CP4 is coupled between the diode D62 and the other end of the capacitor C61, and the variable resistor R61 is used to adjust the reference voltage level at a negative input end of the comparator CP4. The capacitor C62 and the variable resistor R61 are coupled between the other end of the diode D62 and the ground end GND in parallel. As for the impedance sensing signal IMS received by the sample and hold circuit 160, only the positive voltage waveforms are left after being rectified by the diode D61, and then the output voltage VOUT is generated through the charge storage effect of the capacitor C62. The output voltage VOUT can keep the baseband signal portion in the impedance sensing signal IMS, which is provided for the user to judge the acting force between the object to be measured and the quartz crystal surface.

In addition, it should be noted that, the comparator CP5 can be used for comparing the output voltage VOUT and a reference voltage VREF, and enabling a trigger signal VRI when the output voltage VOUT is greater than the reference voltage VREF, for the user to observe a triggering time when the quartz crystal signal reaches a stable state, which may also serve as another parameter for the biological observation experiments.

The embodiment shown in FIG. 3 is merely one of the implementation manners for the circuits of the present invention, but the present invention is not limited thereby. Those of ordinary skill in the art can easily appreciate other feasible circuit architectures or modify the circuit of FIG. 3 under the disclosure of the present invention, and the details about the circuits of the FIG. 3 are not described herein.

In view of the above, the present invention integrates the frequency measurement system and the impedance measurement system into the same measurement system through the switch unit, such that the measurement system of the present invention has two measurement modes that share the same quartz sensing component. With the measurement system of the present invention, the user can all together measure two properties of the object to be measured, including the mass and acting force relation between the object to be measured and the quartz crystal surface, without moving it. Therefore, a more convenient measurement system is provided for the user, which further avoids measurement errors caused by moving the object to be measured.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A measurement system, comprising:
 a quartz sensing component, for sensing an object to be measured;
 a first measurement circuit, with an input end coupled to a first end of the quartz sensing component;
 a second measurement circuit, for outputting a frequency scanning signal; and
 a switch unit, coupled between the first measurement circuit and the quartz sensing component and between the second measurement circuit and the quartz sensing component, for selecting one from outputs of the first measurement circuit and the second measurement circuit, for being output to the quartz sensing component;
 wherein when the first measurement circuit is selected through the switch unit, the first measurement circuit and the quartz sensing component form an oscillation circuit and output a resonance signal, and when the second measurement circuit is selected through the switch unit, the second measurement circuit scans the quartz sensing component by the frequency scanning signal, so as to output an impedance sensing signal.

2. The measurement system according to claim 1, wherein the switch unit is coupled between the first measurement circuit and a second end of the quartz sensing component, and between the second measurement circuit and a second end of the quartz sensing component, for selecting one of an output of the first measurement circuit and the frequency scanning signal, for being output to the second end of the quartz sensing component.

3. The measurement system according to claim 1, further comprising:
 a sample and hold circuit, coupled to the second end of the quartz sensing component, for converting the impedance sensing signal to a baseband signal.

4. The measurement system according to claim 1, further comprising:
 a counter, coupled to the output of the first measurement circuit, for calculating a frequency of the resonance signal.

5. The measurement system according to claim 4, wherein the switch unit and the counter are formed by a complex programmable logic device (CPLD).

6. The measurement system according to claim 1, further comprising:
 an enable circuit, coupled between a voltage source and the first measurement circuit, for controlling a power supply of the first measurement circuit; and
 a bias circuit, coupled to the second end of the quartz sensing component, for determining a DC level at the second end of the quartz sensing component.

7. The measurement system according to claim 6, wherein the first measurement circuit comprises:
 a comparator, with a first input end coupled to the second end of the quartz sensing component, with a second input end coupled to the output of the first measurement circuit;
 a first emitter follower, coupled between a first output of the comparator and the output of the first measurement circuit, for outputting the resonance signal; and
 a capacitor, coupled between the output of the first measurement circuit and a ground end.

8. The measurement system according to claim 7, wherein the first measurement circuit further comprises:
 a second emitter follower, coupled to a second output of the comparator, for outputting a reverse resonance signal;
 wherein the first output and the second output of the comparator are signals with reversed phases, and the resonance signal and the reverse resonance signal have the same frequency.

9. The measurement system according to claim 8, further comprising:
 a counter, coupled to an output of the second emitter follower, for calculating a frequency of the reverse resonance signal.

10. The measurement system according to claim 1, wherein the second measurement circuit comprises a voltage control oscillator (VCO) for outputting the frequency scanning signal.

11. The measurement system according to claim 1, wherein the second measurement circuit comprises a phase lock loop (PLL) for outputting the frequency scanning signal.

12. The measurement system according to claim 1, wherein the second measurement circuit is a signal generator.

13. The measurement system according to claim 1, wherein a frequency scanning range of the frequency scanning signal comprises a resonance frequency of the quartz sensing component.

* * * * *